UNITED STATES PATENT OFFICE.

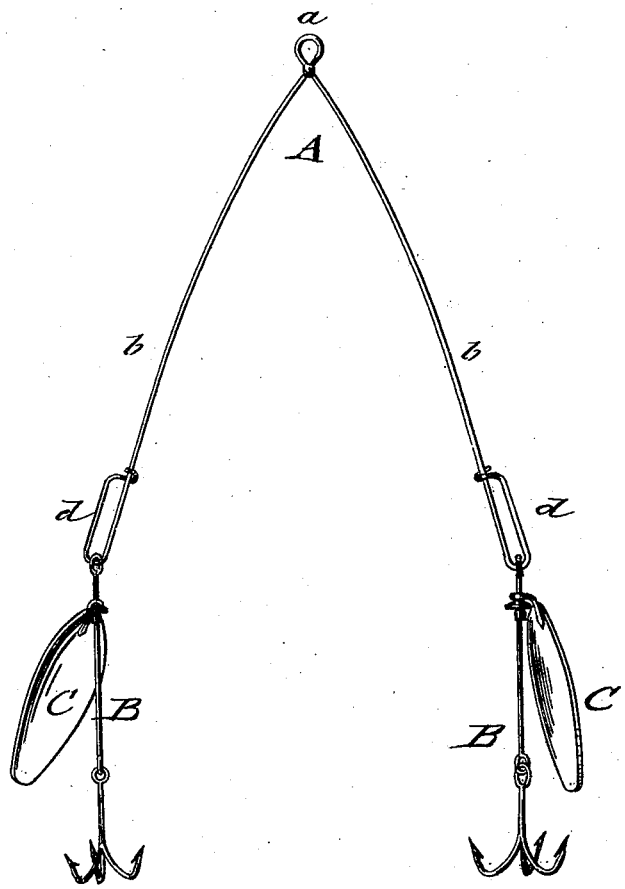

JULIO T. BUEL, OF WHITEHALL, NEW YORK.

IMPROVEMENT IN DOUBLE-SPOON FISHING-TACKLE.

Specification forming part of Letters Patent No. 171,768, dated January 4, 1876; application filed November 27, 1875.

*To all whom it may concern:*

Be it known that I, JULIO T. BUEL, of Whitehall, Washington county, New York, have invented a new and Improved Double-Spoon Fishing-Tackle, of which the following is a specification:

The accompanying drawing represents a side view of my improved double-spoon fishing-tackle.

My invention relates to improvements in fishing-tackle, by which two fish may be caught on the same line, and the hooks so connected after fishing that the entangling is avoided and a smaller space taken up by the same.

The invention consists in a V-shaped wire-spring frame, with snap-hooks at the ends, to which separate hooks with spoons are applied, that act as separate baits when the legs of the spring-frame are spread out, the legs of the frame being locked by the snap-hooks after fishing to take up less space.

In the drawing, A represents the spring-frame, which is made of wire of suitable strength, and of V shape, to which spring action is imparted by an eye or loop, $a$, at the apex or angle of the frame, formed by crossing and attaching the legs or sides $b$, which spread to such a distance that the spoon baits and hooks attached to the outer ends may spin freely without interfering with each other. The draw-line is attached to the eye of the spring-frame, which is properly balanced by the spoons and hooks in its motion through the water, securing the regular spinning of both spoons. At the outer ends of the spring-frame A are snap-hooks $d$, as shown in the drawing, into which the hooks B are easily and quickly inserted, and detached whenever it is desirable to change or remove either of them. A spoon, C, is placed in the customary manner on a washer on the shank of each hook B, the spoons spinning thereby independently of each other, and furnishing increased chances of catching fish at both hooks of the spinning-frame on one draw-line only.

The spring-frame resists any strain, and allows the easy replacing of broken or worn hooks or spoons.

The spring-frame may be readily connected by interlocking the snap-hook ends, so that a smaller space is taken up when the tackle is stored away after fishing. This avoids, also, the entangling of the hooks and lines, and renders the double-spoon spring-frame handier and more convenient. The legs spread instantly as soon as the snap-hook ends are released from each other, so that the tackle is ready for fishing purposes without loss of time.

Having thus described my invention, I claim as new and desire to secure by Letters Patent—

A double-spoon fishing-tackle, composed of a V-shaped spring-frame with separate hooks and spoons attached to the snap-hook ends, substantially as specified.

JULIO T. BUEL.

Witnesses:
PAUL GOEPEL,
T. B. MOSHER.